US011011280B2

(12) United States Patent
Carvajal et al.

(10) Patent No.: US 11,011,280 B2
(45) Date of Patent: May 18, 2021

(54) REACTOR COOLANT SYSTEM PIPING TEMPERATURE DISTRIBUTION MEASUREMENT SYSTEM

(71) Applicant: Westinghouse Electric Company LLC, Cranberry Township, PA (US)

(72) Inventors: Jorge V. Carvajal, Irwin, PA (US); Michael D. Heibel, Harrison City, PA (US); Nicola G. Arlia, Pittsburgh, PA (US); Melissa M. Walter, Butler, PA (US); Robert W. Flammang, Pittsburgh, PA (US); Michael A. James, Harmony, PA (US); David M. Sumego, Cranberry Township, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 295 days.

(21) Appl. No.: 15/066,323

(22) Filed: Mar. 10, 2016

(65) Prior Publication Data

US 2017/0263341 A1    Sep. 14, 2017

(51) Int. Cl.
*G21C 17/022* (2006.01)
*G21C 17/032* (2006.01)
*G21C 17/112* (2006.01)

(52) U.S. Cl.
CPC ......... *G21C 17/022* (2013.01); *G21C 17/032* (2013.01); *G21C 17/112* (2013.01)

(58) Field of Classification Search
CPC .. G21D 1/00; G21D 1/02; G21D 3/00; G21D 3/04; G21D 3/08; G21C 15/00;
(Continued)

(56) References Cited

U.S. PATENT DOCUMENTS 4,145,922 A * 3/1979 Estrada, Jr. ............. G01F 1/667
  374/39
6,345,080 B1 * 2/2002 Bauer .................. G21C 17/022
  250/390.1
(Continued)

FOREIGN PATENT DOCUMENTS

JP    H07260597 A    10/1995
JP    2013-057654 A    3/2013
(Continued)

OTHER PUBLICATIONS

PCT/US2017/016337—International Search Report and Written Opinion, dated Apr. 28, 2017 (Forms PCT/ISA/220, PCT/ISA/210, PCT/ISA/237.
(Continued)

*Primary Examiner* — Marshall P O'Connor
(74) *Attorney, Agent, or Firm* — K&L Gates LLP

(57) ABSTRACT

A system that measures the temperature distribution of the reactor coolant flowing through the hot leg or cold leg pipes by measuring the speed of sound time delay. This concept uses radiation hardened and temperature tolerant ultrasonic signal drivers based on vacuum micro-electronic technology. The system employs ultrasonic signals propagated through water, and relies on the characteristic that the speed of sound changes as the density and temperature of the water changes. Thus, a measured difference in the speed of sound in water may be directly correlated to a temperature change of the water.

10 Claims, 5 Drawing Sheets

(58) Field of Classification Search
CPC ........ G21C 15/24; G21C 17/00; G21C 17/02; G21C 17/022; G21C 17/032
See application file for complete search history.

(56) References Cited

U.S. PATENT DOCUMENTS

| | | | |
|---|---|---|---|
| 6,382,029 | B1 | 5/2002 | Shoureshi et al. |
| 6,480,793 | B1 * | 11/2002 | Martin .................... G01F 1/704 702/100 |
| 7,005,783 | B2 | 2/2006 | Hwu et al. |
| 8,767,903 | B2 | 7/2014 | Seidel et al. |
| 2010/0260305 | A1 * | 10/2010 | Hyde ....................... G21D 7/04 376/299 |
| 2013/0301782 | A1 | 11/2013 | Malloy, III |

FOREIGN PATENT DOCUMENTS

| | | |
|---|---|---|
| WO | 96-36970 A1 | 11/1996 |
| WO | 96/36970 A1 | 11/1996 |

OTHER PUBLICATIONS

NPL Underwater Acoustics—Technical Guides—Speed of Sound in Pure Water, National Physical Laboratory, Teddington, Middlesex, UK, 5 pgs., Crown Copyright 2000.
Extended European Search Report, dated Aug. 1, 2019, 18 Pages.

* cited by examiner

REACTOR COOLANT SYSTEM PIPING TEMPERATURE DISTRIBUTION MEASUREMENT SYSTEM

BACKGROUND

1. Field

This invention relates in general to light water nuclear reactors and in particular to an instrumentation system for monitoring in real time the temperature of the reactor coolant within the reactor coolant system piping.

2. Related Art

The primary side of nuclear reactor power generating systems, which are cooled with water under pressure, comprises a closed circuit which is isolated and in heat exchange relationship with the secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side.

For the purpose of illustration, FIG. 1 shows a simplified nuclear reactor primary system, including a generally cylindrical reactor pressure vessel 10 having a closure head 12 (also shown in FIG. 2), enclosing a nuclear core 14. A liquid reactor coolant, such as water, is pumped into the vessel 10 by pump 16 through a cold leg 23 of the reactor coolant loop piping 20 to the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above described loops are connected to a single reactor vessel 10 by reactor coolant piping 20. At least one of those loops normally includes a pressurizer 19 connected to the hot leg 25 of the reactor coolant loop piping 20 through a charging line 21.

An exemplary reactor design is shown in more detail in FIG. 2. In addition to the core 14, comprised of a plurality of parallel, vertical, co-extending fuel assemblies 22, for purposes of this description, the other vessel internal structure can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in this figure), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180 degrees in a lower plenum 34, passes upwardly through a lower support plate 37 and a lower core plate 36 upon which the fuel assemblies 22 are seated and through and about the assemblies. In some designs, the lower support plate 37 and the lower core plate 36 are replaced by a single structure, the lower core support plate, at the same elevation as the lower support plate 37. The coolant flowing through the core 14 and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals 26, including a circular upper core plate 40. Coolant exiting core 14 flows along the underside of the upper core plate 40 and upwardly through a plurality of perforations 42. The coolant then flows upwardly and radially to one or more outlet nozzles 44.

The upper internals 26 can be supported from the vessel 10 or the vessel head 12 and include an upper support assembly 46. Loads are transmitted between the upper support assembly 46 and the upper core plate 40, primarily by a plurality of support columns 48. A support column is aligned above a selected fuel assembly 22 and perforations 42 in the upper core plates 40.

The rectilinearly movable control rods 28 typically include a drive rod 50 and a spider assembly 52 of neutron poison rods 28 that are guided through the upper internals 26 and into aligned fuel assemblies 22 by control rod guide tubes 54. The guide tubes are fixedly joined to the upper support assembly 46 and connected to the top of the upper core plate 40. By inserting and withdrawing the neutron poison rods into and out of guide thimbles within the fuel assemblies within the core the control rods regulate the extent of the nuclear reactions within the core. Boron, dissolved within the reactor coolant water, also functions to control the nuclear reactions and manages more gradual changes in reactivity than the control rods. By varying the reactivity, the reactor operators can vary the temperature of the coolant within the core.

In nuclear reactor instrumentation systems that are used to track the state of the nuclear reaction within the core, calculation of operating parameters, such as Over Pressure Delta Temperature and Over Temperature Delta Temperature (OP$\Delta$T/OT$\Delta$T) requires high accuracy temperature measurements. Reactor Coolant System (RCS) temperature measurements of fluid in hot leg 25 and cold leg 23 piping are typically accomplished by placing three resistance temperature detectors (RTD) 74 approximately 120 degrees apart around the pipe circumference 66, as shown in FIG. 3. (In other cases six RTDs are placed approximately 60 degrees apart.) The RTD elements 74 are placed in thermowells 76, which enable the RTDs to make physical contact with the coolant water through the thermowell metal interface, and protect the RTD from the impact of the flowing water. The RTD-thermowell interface basically acts as a thermo hydraulic filter.

Conventionally, system temperature values are derived from sampling the three RTDs 74. The RTD signal is initially filtered in order to reduce process and electrical noise. After the initial filtering, streaming corrections based on the mixed mean temperature are performed. After initial filtering and adjustments for streaming, the three resulting signals are compared and, depending on the results, one of the signals can be discarded from downstream processing.

Response time and accuracy of the mixed mean temperature determination are the two main challenges faced by the current RTD-based temperature measurement instrumentation. Typical response time is approximately 2 to 4 seconds. This response time is due to the thermodynamic properties of the RTD-thermowell interface. The response time from the RTD instrumentation is added to the overall system response time.

The mixed mean temperature is a challenging parameter to measure with the current RTD instrumentation and, thus, accuracy in its measurement is difficult to achieve. The fluid in the reactor coolant system hot leg 25 and cold leg 23 is turbulent and not well-mixed, which causes large variations in coolant temperature. Instantaneous temperature differences in excess of 25 degrees F. exist within the hot leg as depicted in FIG. 4. This rapid temperature fluctuation is another source of error allowance needed. The RTDs 74 only measure temperature at discrete points within the turbulent flow which, as described before, can result in inaccurate, abrupt changes in measured temperature.

SUMMARY

The foregoing issues are overcome by a nuclear reactor system that provides a real-time measure of the mixed mean temperature of the reactor coolant at the sensor locations, comprising: a reactor vessel; a nuclear core including a plurality of nuclear fuel assemblies housed within the reactor vessel and immersed within a reactor coolant, the fuel assemblies structured to heat the reactor coolant; a primary coolant loop piping system in fluid communication with a heat utilization mechanism and the reactor vessel, for conveying the reactor coolant between the reactor vessel and the heat utilization mechanism and back to the reactor vessel; and an auxiliary piping system in fluid communication with the primary coolant piping for adding or extracting reactor coolant to or from the primary coolant loop piping system. An acoustic transmitter is acoustically coupled to a first location on an outer surface of either the primary coolant loop piping system or the auxiliary piping system and configured to transmit an acoustic pulse through the reactor coolant. Preferably, the acoustic pulse is a continuous signal of pulses. An acoustic receiver is acoustically coupled to a second location on an outer surface of the either of the primary coolant piping system or the auxiliary piping system that is substantially diametrically opposed to the first location, with the acoustic receiver configured to receive the acoustic pulse. An acoustic control system is connected to the acoustic transmitter and the acoustic receiver and configured to determine the time lag between the transmission of the acoustic pulse at the acoustic transmitter and the receipt of the acoustic pulse at the acoustic receiver and correlate the time lag to a temperature of the reactor coolant.

In one embodiment the nuclear reactor system further includes a second acoustic transmitter acoustically coupled to a third location on the outer surface of the either of the primary coolant loop piping system or the auxiliary piping system and configured to transmit a second acoustic pulse through the reactor coolant; and a second acoustic receiver acoustically coupled to a fourth location on the outer surface of the either of the primary coolant piping system or the auxiliary piping system that is substantially diametrically opposed to the third location, with the acoustic receiver configured to receive the second acoustic pulse. In this latter embodiment, the acoustic control system is also connected to the second acoustic transmitter and the second acoustic receiver and is configured to determine a second time lag between the transmission of the second acoustic pulse at the second acoustic transmitter and the receipt of the second acoustic pulse at the second acoustic receiver and correlate the second time lag to a temperature of the reactor coolant.

Preferably, the acoustic pulse is an ultrasonic pulse and the system includes a flow meter configured to measure the speed of the reactor coolant within the either of the primary coolant piping system or the auxiliary piping system and provide an output indicative thereof that is communicated to the acoustic control system, wherein the acoustic control system uses the output of the flow meter to compensate the temperature for changes in the speed of the reactor coolant.

In another embodiment, the system includes a boron concentration meter configured to determine and provide an output indicative of the real-time concentration of boron within the reactor coolant, wherein the acoustic control system has an input from the output of the boron concentration meter to compensate the temperature for changes in a boron concentration within the reactor coolant.

In one such arrangement, the either of the primary coolant piping system or the auxiliary piping system is a hot leg of the primary coolant piping system. In another such arrangement, the either of the primary coolant piping system or the auxiliary piping system is a cold leg of the primary coolant piping system. Preferably, the acoustic transmitter and the acoustic receiver comprise solid state vacuum micro-electronic devices and the acoustic transmitter and the acoustic receiver are powered by a thermoelectric generator having a hot junction in thermal communication with a wall of the either of the primary coolant piping system or the auxiliary piping system. Desirably, the thermal communication is through a heat pipe that extends through thermal insulation surrounding the piping and the thermoelectric generator is positioned outside of the insulation.

Desirably, the transmitted pulse of the acoustic transmitter and the output of the acoustic receiver are connected to a wireless transmitter and the transmitted pulse from the acoustic transmitter and the output of the acoustic receiver are wirelessly transmitted to the acoustic control system. Preferably, the wireless transmitter comprises solid state vacuum micro-electronic devices.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
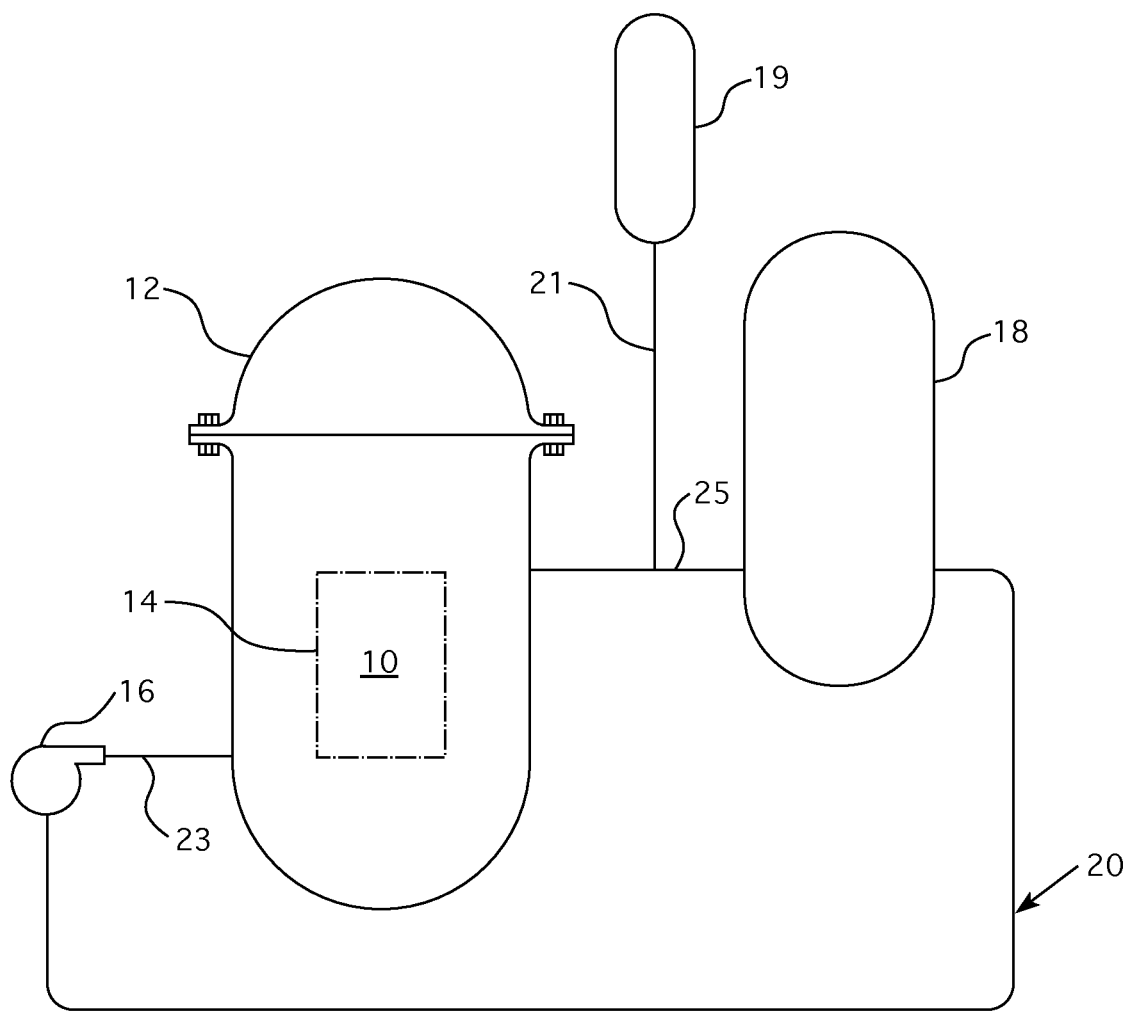
FIG. 1 is a simplified schematic of a nuclear reactor system to which this invention can be applied.
Figure 2:
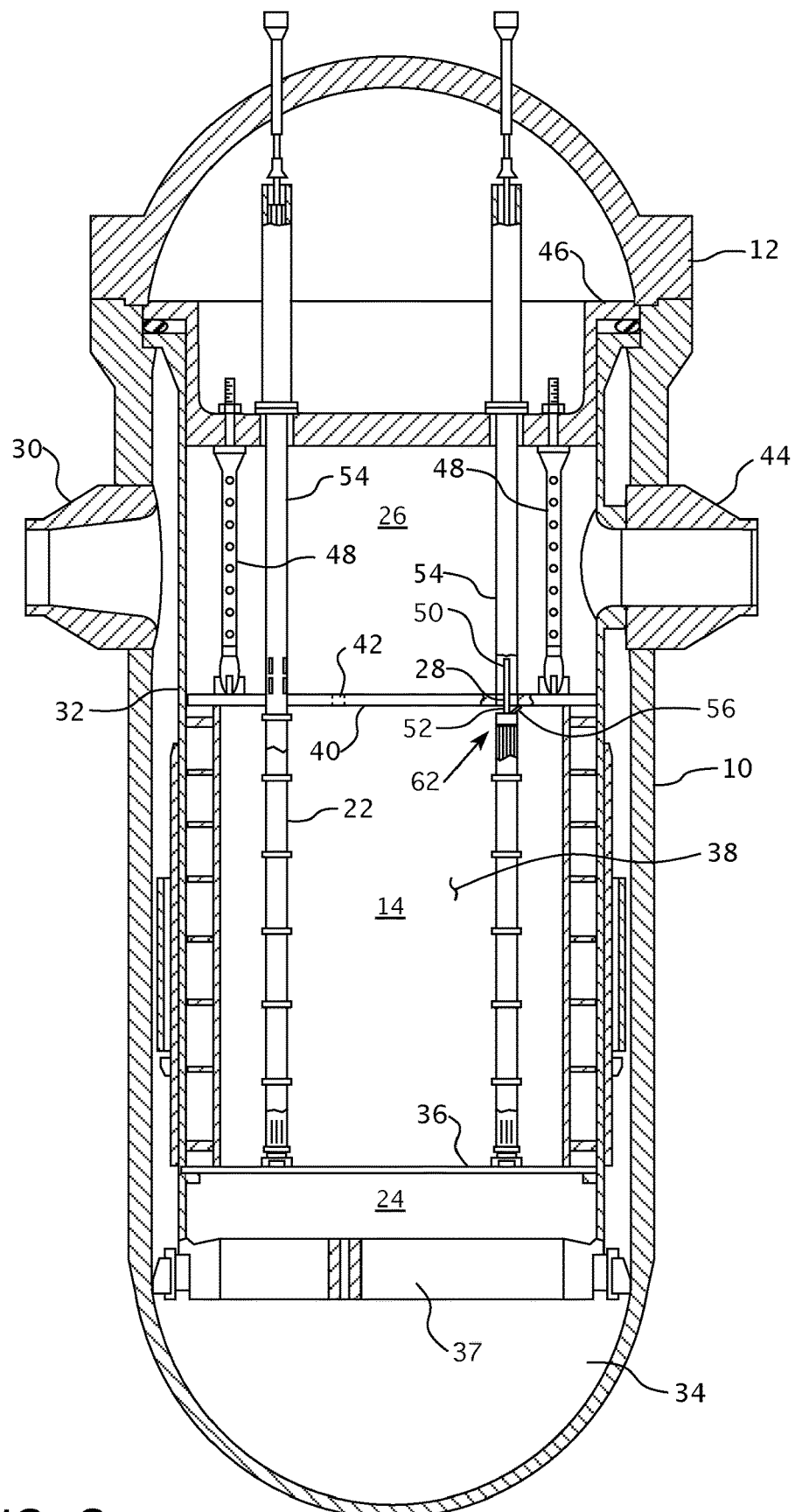
FIG. 2 is an elevational view, partially in section, of a nuclear reactor vessel and internals components to which this invention can be applied.
Figure 3:
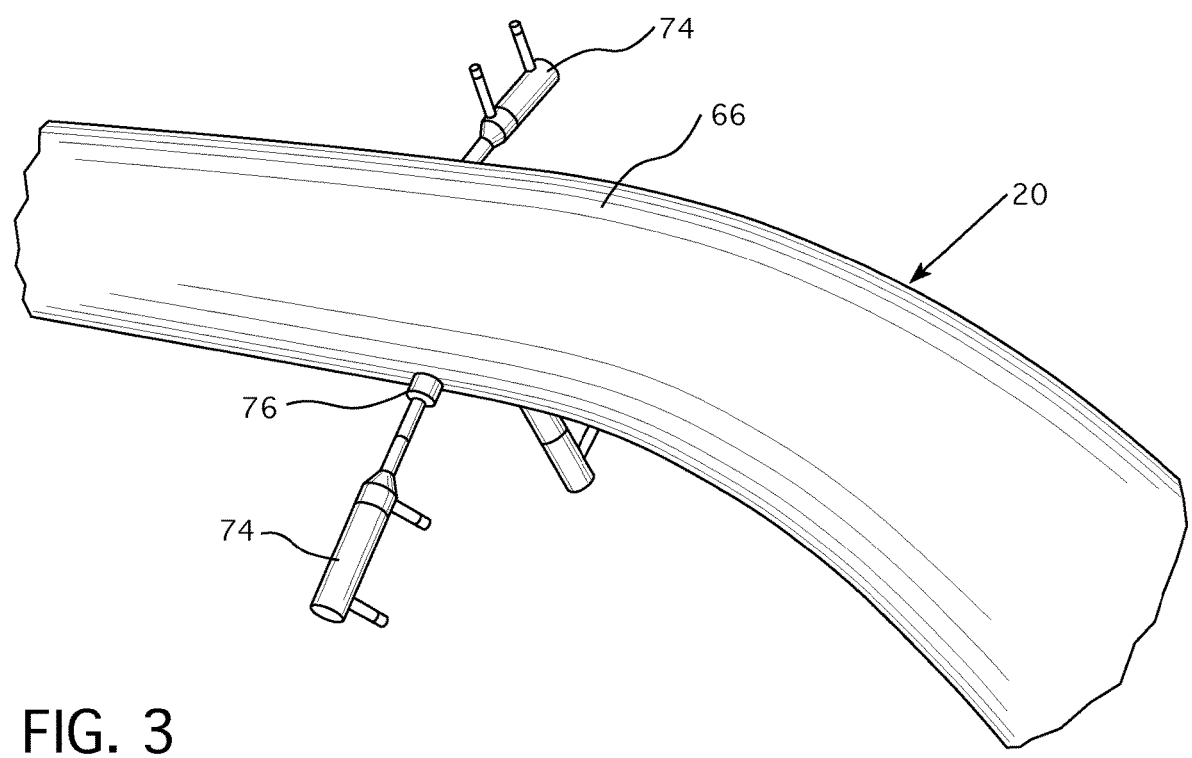
FIG. 3 is a schematic view of a conventional RTD system with the RTD's placed 120 degrees apart around a circumference of a pipe.
Figure 4:
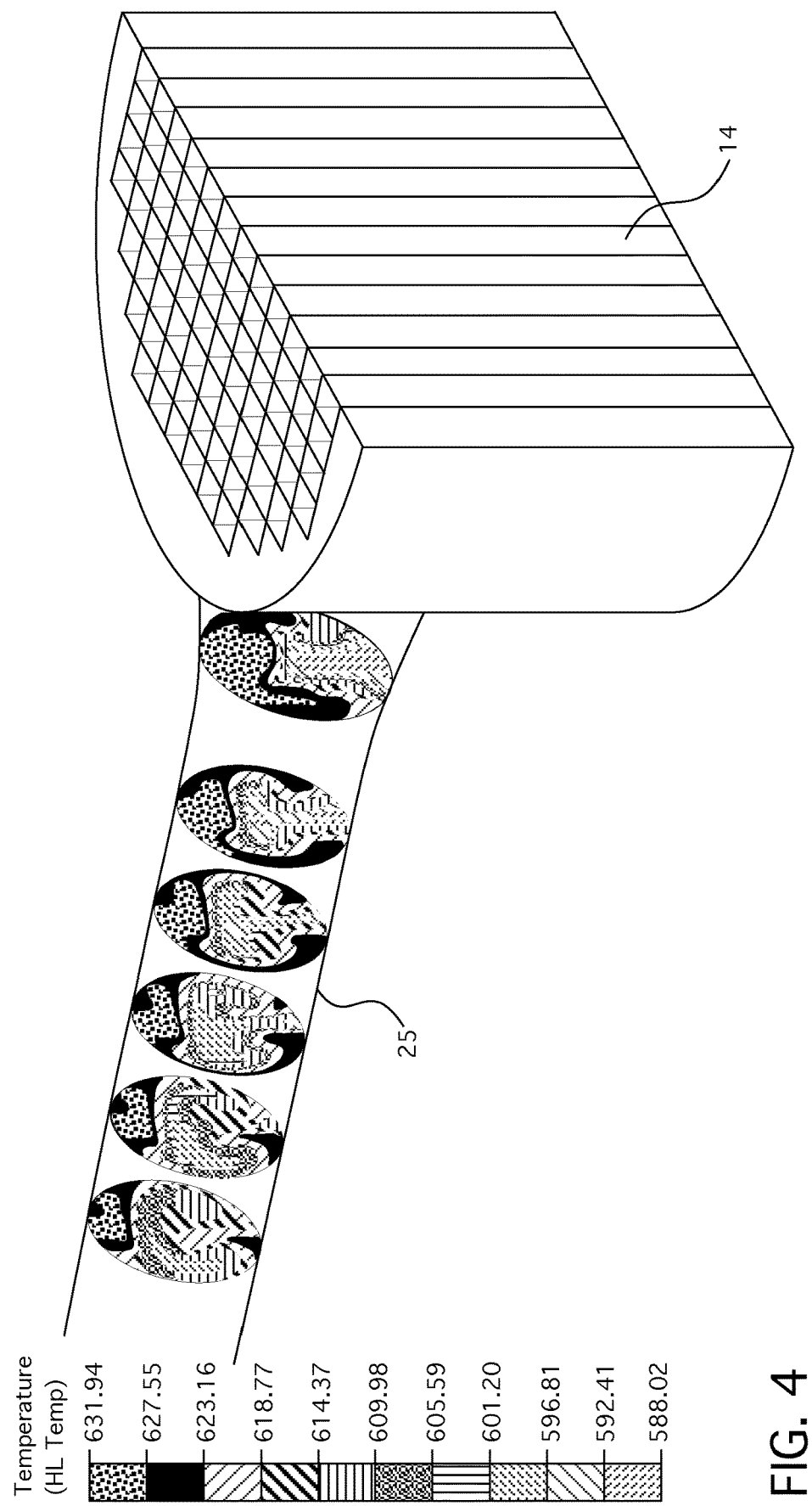
FIG. 4 is a graphical representation of an exemplary temperature variation in a hot leg piping.
Figure 5:
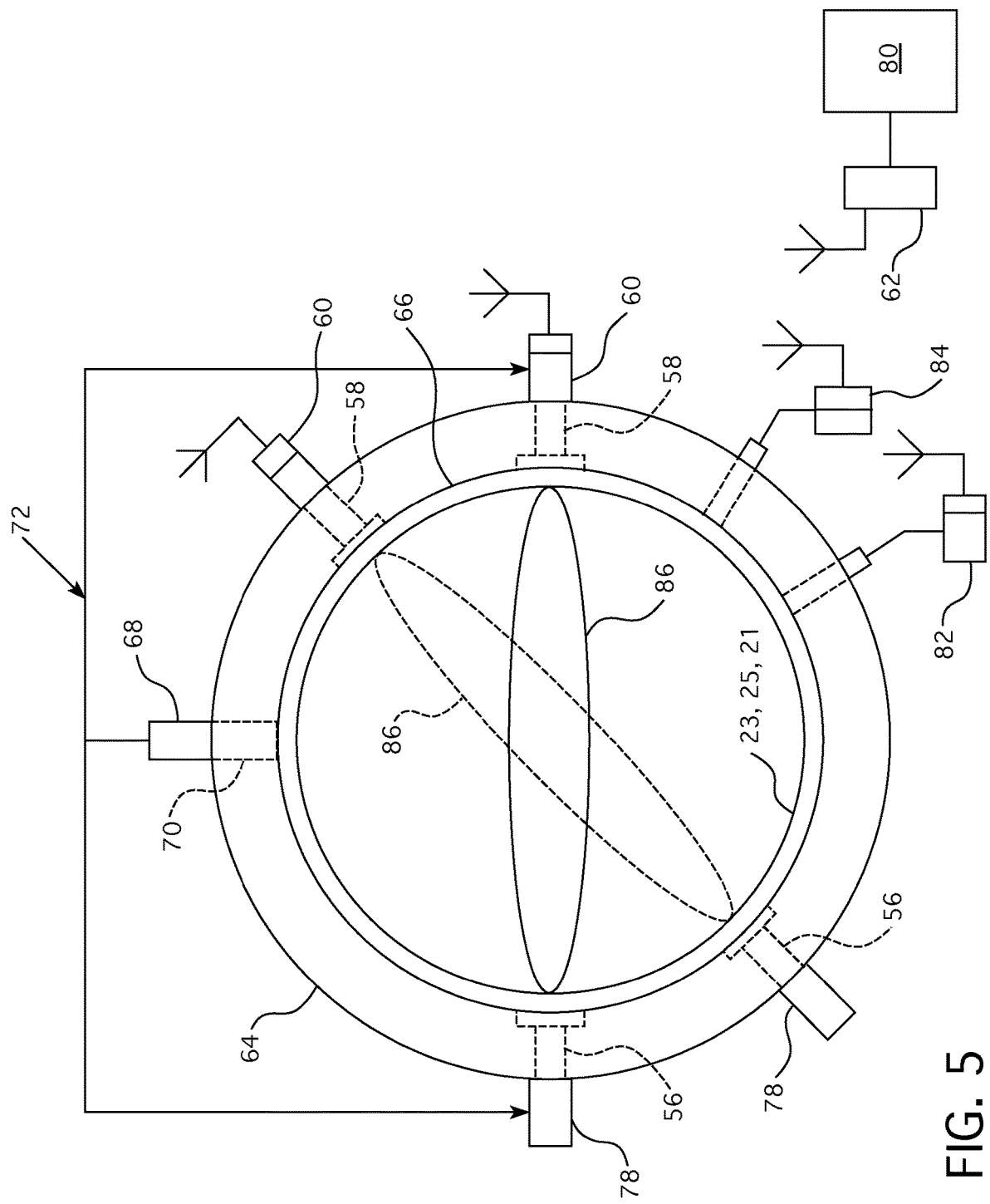
FIG. 5 is schematic of a cross-section of an exemplary reactor system piping with the devices of one embodiment of this invention shown in block form.

One preferred embodiment of this invention comprises employing several ultrasonic transmitters 56 and receivers 58 positioned 180 degrees apart around the circumference of the RCS hot or cold leg piping 25, 23, as shown in FIG. 5. A solid state vacuum microelectronic device signal driver 78 powered by thermo-electric generator (TEG) 68 sends a continuous ultrasonic signal through the pipe 23, 25, 21 and the water flowing through it. The thermoelectric generator 68 is in thermal communication with the pipe surface 66, with the hot junction of the thermoelectric generator supported outside of the pipe insulation 64 and in thermal contact with one end of the heat pipe 70. The other end of the heat pipe 70 extends through the insulation and is supported in thermal contact with the pipe surface 66. The signal received on the other side of the pipe by the ultrasonic receiver 58 is wirelessly transmitted by the wireless transmitter 60 to an acoustic control system 80 by way of a wireless receiver 62, at a base station elsewhere for post-processing. The speed of the signal traveling through the reactor coolant system pipe varies as the temperature of the water flowing through it changes; therefore, the temperature of the coolant flowing through the pipe is correlated to the speed of the signal. The preferred embodiment of the sensors, signal processing, and wireless transmission electronics devices utilize vacuum micro-electronic device based electronics and materials. The characteristics of these device based electronics and materials allow the critical features of these devices to be replaced by micro-scale vacuum tube technology having performance characteristics shown to be essentially impervious to radiation damage and very high temperatures. An application of the vacuum micro-electronic devices wireless transmitter technology is disclosed in U.S. Pat. No. 8,767,903, entitled "Wireless In-Core Neutron Monitor." Such devices, known as SSVDs, are commercially available from Innosys Inc., Salt Lake City, Utah. An example of such a device can be found in U.S. Pat. No. 7,005,783. It must be noted that the speed of the ultrasonic signal might vary also due to the speed of the water flow in the pipe, therefore, the system will compensate accordingly for this variable. The average velocity of the coolant is determined from the average flow rate derived from the elbow tap ΔP measurements. Since the plants operate the pumps at a constant speed during power operations, this parameter will not influence the total measurements significantly. Nevertheless, in the interest of improving the accuracy of the temperature measurement, the outputs from existing coolant flow meters within conventional reactor systems can be used to compensate for this affect. Such a flow meter output can be wirelessly transmitted to the acoustic control system 80, as schematically represented by block 82 in FIG. 5. Similarly, changes in the boron concentration within the reactor coolant can affect the speed of sound through the coolant. A boron concentration meter, schematically represented by block 84 in FIG. 5, can be employed to wirelessly provide an output indicative of the boron concentration of the coolant, to the acoustic control system 80 to compensate the mixed mean temperature determination for changes in boron concentration. Any boron concentration meter cable of detecting the concentration of the boron in the coolant at the monitored location and transmit an output indicative thereof can be used for this purpose, though an example of such a meter can be found in U.S. patent Ser. No. 15/066607, entitled "Real-Time Reactor Coolant System Boron Concentration Monitor Utilizing An Ultrasonic Spectroscopy System," filed concurrently herewith.

Prior to the installation of the hardware, an Electro-Magnetic Interference (EMI) site survey is performed in order to identify potential sources of noise or interference. The transmission frequency for the wireless data transfer is chosen to occupy an unused frequency band at the RCS pipe location. The received measured signal is also filtered as needed in order to minimize electrical interference and other related issues impacting the accuracy of the transmitted signal. The DC power 72 required by the ultrasonic signal driver 78, ultrasonic signal receiver 58 and the wireless data transmitter 60 is generated via one or more thermoelectric generators 68 that have the heated junction connected to the heat pipe and the cold junction located on the opposite side of the pipe. It should be noted that the vacuum micro-electronic device ultrasonic signal hardware and wireless data transmitter can be powered by a conventional cable, if necessary. In the same way, measurement data could also be transmitted through conventional cabling. Typical Pressurized Water Reactors (PWRs) operate at 2,220 psig and 626° F. According to the N. Bilaniuk and G. S. K. Wong model from N. Bilaniuk and G. S. K. Wong (1993), *Speed of Sound in Pure Water as a Function of Temperature*, J. Acoust. Soc. Am. 93(3) pp 1609-1612, as amended by N. Bilaniuk and G. S. K. Wong (1996), Erratum: *Speed of Sound in Pure Water as a Function of Temperature*, [J. Acoust. Soc. Am. 93, 1609-1612 (1993)], J. Acoust. Soc. Am. 99(5), p 3257, the speed of sound in water is c=5,062.664 ft/s at 212.00° F. and 5,062.336 ft/s at 212.18° F. Using equation 1, the travel time of the signal can be calculated.

$$t = \frac{d}{c} \qquad \text{equation 1}$$

where d is the diameter of the pipe and c is the speed of sound in water at a specific temperature. A temperature change between 212.00° F. and 212.18° F. (temperature delta of 0.1° C.) in a typical 31 inch RCS pipe results in a speed of sound change of 0.328 ft/s, which results in a travel time change of 33 nsec. The base station receiving the signal employs an ultra-stable commercial off the shelf crystal oscillator clock at 1,000 MHz in order to distinguish a 33 nsec change in the time of receipt of the signal.

By using the above described instrumentation and methodology, two important characteristics are improved compared to conventional systems. The first involves the mixed mean temperature accuracy. The fact that the flow is not well mixed in the RCS piping will not affect the type of instrumentation and methodology being proposed in this disclosure because this system is not taking discrete measurements. Instead, by measuring the time delay of the ultrasonic pulse from one side of the pipe to the other, a mean measurement is acquired by default. The final temperature measurement acquired, reflects the mean temperature of the ellipsoid-shaped volume 86 in the acoustic signal. The second concerns response time. The thermodynamic slow response time from the thermowell-RTD interface is eliminated by this system and significantly improved from approximately 3 seconds to only hundreds of milliseconds because the ultrasonic signal travel time, the standard response time of the SSVD and the response time of the base station electronics are in the range of hundreds of milliseconds.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor system comprising:
   a reactor vessel;
   a nuclear core including a plurality of nuclear fuel assemblies housed within the reactor vessel and configured to be immersed within a reactor coolant, the fuel assemblies structured to heat the reactor coolant;
   a primary coolant loop piping system configured to be in fluid communication with a heat utilization mechanism and the reactor vessel for conveying the reactor coolant between the reactor vessel and the heat utilization mechanism and back to the reactor vessel;

an auxiliary piping system in fluid communication with the primary coolant loop piping system and being configured to add or extract reactor coolant to or from the primary coolant loop piping system;

an acoustic transmitter acoustically coupled to a first location on an outer surface of either the primary coolant loop piping system or the auxiliary piping system and configured to transmit an acoustic pulse through the reactor coolant;

an acoustic receiver acoustically coupled to a second location on an outer surface of the either of the primary coolant loop piping system or the auxiliary piping system that is substantially diametrically opposed to the first location, with the acoustic receiver configured to receive the acoustic pulse;

a flow meter configured to measure a speed of the reactor coolant within the either of the primary coolant loop piping system or the auxiliary piping system and provide an output indicative thereof;

a boron concentration meter configured to measure a boron concentration in the reactor coolant and provide an output indicative thereof; and an acoustic control system connected to the acoustic transmitter and the acoustic receiver, wherein the acoustic control system is configured to:
receive a first output from the flow meter;
receive a second output from the boron concentration meter; and
determine a temperature of the reactor coolant based on:
a time lag between a transmission of the acoustic pulse at the acoustic transmitter and a receipt of the acoustic pulse at the acoustic receiver;
the output of the flow meter; and
the output of the boron concentration meter.

2. The nuclear reactor system of claim 1 including:
a second acoustic transmitter acoustically coupled to a third location on the outer surface of the either of the primary coolant loop piping system or the auxiliary piping system and configured to transmit a second acoustic pulse through the reactor coolant;
a second acoustic receiver acoustically coupled to a fourth location on the outer surface of the either of the primary coolant loop piping system or the auxiliary piping system that is substantially diametrically opposed to the third location, with the acoustic receiver configured to receive the second acoustic pulse; and
wherein the acoustic control system is also connected to the second acoustic transmitter and the second acoustic receiver and is configured to determine a second time lag between a transmission of the second acoustic pulse at the second acoustic transmitter and the receipt of the second acoustic pulse at the second acoustic receiver and correlate the second time lag to a temperature of the reactor coolant.

3. The nuclear reactor system of claim 1 wherein the acoustic pulse is an ultrasonic pulse.

4. The nuclear reactor system of claim 1 wherein the either of the primary coolant loop piping system or the auxiliary piping system is a hot leg of the primary coolant loop piping system.

5. The nuclear reactor system of claim 1 wherein the either of the primary coolant loop piping system or the auxiliary piping system is a cold leg of the primary coolant loop piping system.

6. The nuclear reactor system of claim 1 wherein the acoustic transmitter and the acoustic receiver comprise solid state vacuum micro-electronic devices.

7. The nuclear reactor system of claim 1 further including a thermoelectric generator having a hot junction in thermal communication with a wall of the either of the primary coolant loop piping system or the auxiliary piping system, and wherein the acoustic transmitter and the acoustic receiver are powered by the thermoelectric generator.

8. The nuclear reactor system of claim 1 wherein the transmitted pulse of the acoustic transmitter and the output of the acoustic receiver are connected to a wireless transmitter and the transmitted acoustic pulse from the acoustic transmitter and the output of the acoustic receiver are wirelessly transmitted to the acoustic control system.

9. The nuclear reactor system of claim 8 wherein the wireless transmitter comprises solid state vacuum micro-electronic devices.

10. The nuclear reactor system of claim 1 wherein the transmitted acoustic pulse is a continuous stream of pulses.

* * * * *